United States Patent
Lee et al.

(10) Patent No.: US 10,997,747 B2
(45) Date of Patent: May 4, 2021

(54) TARGET POSITIONING WITH BUNDLE ADJUSTMENT

(71) Applicant: Trimble Inc., Sunnyvale, CA (US)

(72) Inventors: Young Jin Lee, Westminster, CO (US); Kent Kahle, Hayward, CA (US); Malte Seidler, Louisville, CO (US)

(73) Assignee: Trimble Inc., Sunnyvale, CA (US)

( * ) Notice: Subject to any disclaimer, the term of this patent is extended or adjusted under 35 U.S.C. 154(b) by 102 days.

(21) Appl. No.: 16/407,358

(22) Filed: May 9, 2019

(65) Prior Publication Data

US 2020/0357134 A1    Nov. 12, 2020

(51) Int. Cl.
```
G06T 7/73      (2017.01)
G03B 17/56     (2021.01)
H04N 5/247     (2006.01)
G06T 7/80      (2017.01)
```

(52) U.S. Cl.
CPC .............. *G06T 7/74* (2017.01); *G03B 17/561* (2013.01); *G06T 7/80* (2017.01); *H04N 5/247* (2013.01)

(58) Field of Classification Search
CPC . G06T 7/74; G06T 2207/30244; G06T 17/00; G06T 7/55; G06T 7/73; G06T 7/80; G06T 2207/10016; H04N 13/246; G03B 17/56

See application file for complete search history.

(56) References Cited

U.S. PATENT DOCUMENTS

| | | | |
|---|---|---|---|
| 2,685,082 A | 7/1954 | Beman et al. | |
| 2,966,090 A | 12/1960 | Scholdstrom | |
| 4,942,539 A | 7/1990 | McGee et al. | |
| 5,926,260 A | 7/1999 | Dunne et al. | |
| 6,064,398 A | 5/2000 | Ellenby et al. | |
| 6,097,429 A | 8/2000 | Seeley et al. | |
| 6,536,536 B1 | 3/2003 | Gass et al. | |
| 6,671,058 B1 | 12/2003 | Braunecker et al. | |
| 6,697,147 B2 | 2/2004 | Ko et al. | |

(Continued)

FOREIGN PATENT DOCUMENTS

CN    106408650 A  *  2/2017
CN    108709558 A  *  10/2018

(Continued)

OTHER PUBLICATIONS

International Search Report and Written Opinion for Application No. PCT/US2014/025073 dated Nov. 6, 2014, 18 pages.

(Continued)

*Primary Examiner* — Jingge Wu
(74) *Attorney, Agent, or Firm* — Kilpatrick Townsend & Stockton LLP

(57) ABSTRACT

A Position and Orientation Measurement Engine (POME) is a mobile camera system that can be used for accurate indoor measurement (e.g., at a construction site). The POME uses a plurality of cameras to acquire images of a plurality of targets. If locations of the plurality of targets are precisely known, images of the targets can be used to determine a position of the POME in relation to the plurality of targets. However, to precisely determine locations of the plurality of targets can be time consuming and/or use expensive equipment. This disclosure discusses how to use the POME itself to determine locations of the plurality of targets.

20 Claims, 12 Drawing Sheets

(56) References Cited

U.S. PATENT DOCUMENTS

| | | | |
|---|---|---|---|
| 6,782,644 | B2 | 8/2004 | Fujishima et al. |
| 6,919,880 | B2 | 7/2005 | Morrison et al. |
| 6,959,868 | B2 | 10/2005 | Tsikos et al. |
| 6,985,620 | B2 | 1/2006 | Sawhney et al. |
| 7,215,364 | B2 | 5/2007 | Wachtel et al. |
| 7,540,334 | B2 | 6/2009 | Gass et al. |
| 8,229,595 | B2 | 7/2012 | Seelinger et al. |
| 8,350,908 | B2 | 1/2013 | Morris et al. |
| 8,874,406 | B2 | 10/2014 | Røtvold et al. |
| 9,201,424 | B1* | 12/2015 | Ogale ............... G05D 1/0253 |
| 9,687,950 | B2 | 6/2017 | Kahle et al. |
| 10,347,008 | B2 | 7/2019 | Kahle et al. |
| 2003/0038179 | A1 | 2/2003 | Tsikos et al. |
| 2003/0044048 | A1 | 3/2003 | Zhang et al. |
| 2003/0147727 | A1 | 8/2003 | Fujishima et al. |
| 2006/0174302 | A1 | 8/2006 | Mattern et al. |
| 2006/0271298 | A1 | 11/2006 | MacIntosh et al. |
| 2008/0047170 | A1 | 2/2008 | Nichols |
| 2008/0196912 | A1 | 8/2008 | Gass et al. |
| 2008/0211915 | A1 | 9/2008 | McCubbrey |
| 2008/0240616 | A1 | 10/2008 | Haering et al. |
| 2009/0110241 | A1* | 4/2009 | Takemoto ........... H04N 13/207 382/103 |
| 2009/0268214 | A1* | 10/2009 | Lucic ..................... G06T 7/73 356/614 |
| 2010/0046791 | A1 | 2/2010 | Glickman et al. |
| 2010/0066676 | A1 | 3/2010 | Kramer et al. |
| 2010/0097443 | A1 | 4/2010 | Lablans |
| 2010/0183422 | A1 | 7/2010 | Makela et al. |
| 2010/0234993 | A1 | 9/2010 | Seelinger et al. |
| 2011/0115909 | A1 | 5/2011 | Sternberg et al. |
| 2012/0136475 | A1 | 5/2012 | Kahle |
| 2012/0303336 | A1 | 11/2012 | Becker et al. |
| 2013/0137079 | A1 | 5/2013 | Kahle et al. |
| 2013/0250117 | A1 | 9/2013 | Pixley et al. |
| 2014/0016821 | A1 | 1/2014 | Arth et al. |
| 2014/0218612 | A1 | 8/2014 | Belsarkar |
| 2014/0267254 | A1 | 9/2014 | Sievert et al. |
| 2014/0267685 | A1 | 9/2014 | Kahle et al. |
| 2015/0036888 | A1 | 2/2015 | Weisenburger |
| 2015/0098079 | A1 | 4/2015 | Montgomery et al. |
| 2015/0268043 | A1 | 9/2015 | McFadden et al. |
| 2016/0026253 | A1 | 1/2016 | Bradski et al. |
| 2016/0150142 | A1 | 5/2016 | Lapstun et al. |
| 2016/0187130 | A1 | 6/2016 | Metzler et al. |
| 2017/0228878 | A1 | 8/2017 | Goldman et al. |
| 2018/0143756 | A1 | 5/2018 | Mildrew et al. |
| 2018/0189565 | A1* | 7/2018 | Lukierski ........... H04N 5/23238 |
| 2019/0325608 | A1* | 10/2019 | Taya ..................... G06T 7/70 |
| 2020/0169718 | A1* | 5/2020 | Begeja ............... G06K 9/6202 |

FOREIGN PATENT DOCUMENTS

| | | |
|---|---|---|
| EP | 2 116 919 A1 | 11/2009 |
| EP | 3 034 995 A1 | 6/2016 |
| FR | 2 630 538 A1 | 10/1989 |
| WO | 2010/0148526 A1 | 12/2010 |

OTHER PUBLICATIONS

Gong, et al., "An Object Recognition, Tracking and Contextual Reasoning-based Video Interpretation Method for Rapid Productivity Analysis of Construction Operations," Automation in Construction, Elsevier Science Publishers, Amsterdam, NL., May 9, 2011, pp. 1121-1226.

3D Reconstruction from Multiple Images, downloaded at http://en.wikipedia.org/wiki/3D_reconstruction_from_multiple_images, downloaded Oct. 8, 2012, 6 pages.

Photogrammetry, http://en.wikipedia.org/wiki/Photogrammetry, downloaded Oct. 9, 2012, 3 pages.

Extended European Search Report for EP Application No. 18188560.9 dated Dec. 4, 2018, 8 pages.

"Grade Control for Dozers," Civil Engineering and Construction, downloaded from http://construction.trimble.com/products-and-solutions/grade-control-dozers, 2 pages.

"Trimble Total Stations," Transforming the Way the World Works, downloaded from http://trl.trimble.com/docushare/dsweb/Get/Document-752084/022516-168B_Trimble_S-Series_TS_BRO_US_0416_LR.pdf, 16 pages.

Kan, Z. "Vision-Based Estimation and Control," downloaded from https://sites.google.com/site/kanzhen0322/reserach/vision, 4 pages.

"ECAMSECURE," Commercial Security Systems, Video Monitoring, downloaded from https://www.ecamsecure.com/, 4 pages.

Montgomery, et al., "Intelligent Construction Tools LLC, POME A mobile camera system for accurate indoor pose," Nov. 2, 2016, 37 pages, downloaded at http://web.stanford.edu/group/scpnt/pnt/PNT16/2016_Presentation_Files/i10-Montgomery.pdf.

Bundle Adjustment, https://en.wikipedia.org/wiki/Bundle_adjustment, downloaded on Aug. 20, 2019, 3 pages.

U.S. Appl. No. 16/520,069, electronically filed Jul. 23, 2019, 54 pages.

U.S. Appl. No. 16/520,069 Non-Final Office Action dated Jun. 2, 2020, 12 pages.

Invitation to Pay Additional Fee and, Where Applicable, Protest Fee for Application No. PCT/US2020/031935, dated Aug. 12, 2020, 4 pages.

International Search Report and Written Opinion for Application No. PCT/US2020/031935, dated Oct. 6, 2020, 19 pages.

U.S. Appl. No. 16/520,069 Final Office Action dated Sep. 21, 2020, 12 pages.

U.S. Appl. No. 16/520,069 Notice of Allowance dated Jan. 8, 2021, 8 pages.

* cited by examiner

TARGET POSITIONING WITH BUNDLE ADJUSTMENT

BACKGROUND

This disclosure relates to systems and methods that facilitate positioning points and objects in a workspace or at a worksite, such as for example at a construction site. When the interior of a building is being finished, connectors, anchors, and the like are attached to the floors, ceilings and other structures in the building and cuts are made and holes drilled using power saws and drills. This can be accomplished using special power tools at numerous precisely defined positions in the building. For example, nail guns, power saws, powder anchor tools, and the like are used to nail, cut, install fasteners, and perform other operations at predetermined points within the building with little error. In a building, a large number of electrical, plumbing, and HVAC components are to be properly sited and installed, usually with power tools. Additionally, finishing a building interior can also include a number of different tools, to be used at precisely defined positions, such as for example reinforcement bar scanners. Positioning both power tools and non-power tools is to be accomplished quickly and with some precision with respect to the surrounding walls, ceilings and floors as they are roughed in. Typically, it has required a significant amount of labor to lay out various construction points at such a construction site. Teams of workers have been needed to measure and mark predetermined locations. It will be appreciated that this process has been subject to errors, resulting from measurement mistakes and from accumulated errors. Further, the cost of this layout process and the time needed to perform the layout process have both been significant.

Various location determining systems, including systems that incorporate one or more robotic total stations, have been used for building layout. The total station in such a system, at a fixed, known position, directs a beam of laser light at a retro-reflective target. As the target moves, robotics in the total station cause the beam of laser light to track the target. By measuring the time of travel of the beam from the total station to the retro-reflective target and then back to the total station, the distance to the target can be determined. The directional orientation of the beam to the target is also measured. Since the dimensional coordinates of the total station are known, the dimensional coordinates of the retro-reflective target can easily be determined. Based on the measured position of the retro-reflective target, and the desired position of some building feature, such as a drilled hole, or a fastener, the operator can move the reflector to the desired position, and mark the position.

Although position determination systems, such as ranging radio systems and robotic total station systems, can facilitate and speed the layout process, nevertheless the layout process has continued to be lengthy, tedious, and expensive. Previous applications have been filed addressing systems and/or methods to reduce construction expense and/or labor. For example, U.S. patent application Ser. No. 13/800,350, filed Mar. 13, 2013, and U.S. patent application Ser. No. 15/676,023, filed Aug. 14, 2017, which are incorporated by reference.

BRIEF SUMMARY

In some embodiments, A Position and Orientation Measurement Engine (POME) is used to determine target locations instead of using a total station to determine target locations. Using the POME to calculate target positions can be simpler, save time, and/or be less expensive than using the total station.

In some embodiments, a method for determining target positions using bundle adjustment comprises: placing a camera system at a plurality of positions; acquiring images of a plurality of targets while the camera system is placed at the plurality of positions, wherein the plurality of positions includes a first position, a second position, and one or more other positions; determining a distance between the first position and the second position; estimating relative heading orientations between a first heading of the camera system while at the first position and a second heading of the camera system while at the second position based on images of the plurality of targets; estimating height position of targets based on estimates of relative heading orientations and images of the plurality of targets; calculating initial target locations using the distance between the first position and the second position, relative heading orientations of the camera system at the first position and at the second position, and images of the plurality of targets acquired by the camera system while the camera system was at the first position and at the second position; calculating initial locations of the one or more other positions based on the initial target locations and images of the plurality of targets acquired by the camera system while the camera system was at the one or more other positions; and/or calculating actual locations of the plurality of positions and actual target locations by running bundle adjustment with initial positions of the one or more other positions and initial target locations as initial values for the bundle adjustment. In some embodiments, placing the camera system at the first position and at the second position is performed by keeping changes to the relative heading less than plus or minus 5 degrees in at least one of three degrees of rotational freedom; the camera system comprises a plurality of image sensors, wherein: The plurality of image sensors are oriented around a center of the camera system, and/or orientations of the image sensors relative to each other are known; the camera system comprises a pole and/or the method further comprises resting the camera system on the ground at the first position and at the second position using the pole; the targets are uniquely identifiable to the camera system; and/or placing the camera system at the second position includes placing the camera system at the second position so that the camera system has similar roll and/or pitch compared to the camera system while placed at the first position. In some embodiments, the method can comprise determining an error range of heading orientations of the camera system at the second position in relation to an orientation of the camera system while at the first position; calculating initial target locations based on optimizing camera system heading within the error range; and/or adding a set of one or more targets to the plurality of targets, wherein the set of one or more targets includes one or more targets that were not identified as targets by the camera system at both the first position and/or at the second position.

In some embodiments, a system comprises: a camera system comprising a plurality of image sensors oriented around a center of the camera system; a plurality of targets for stationary placement in an area; and/or one or more memory devices containing instructions that when executed cause one or more processors to: acquire images of the plurality of targets while the camera system is placed at a plurality of positions, wherein the plurality of positions includes a first position, a second position, and one or more other positions; estimate relative heading orientations between a first heading of the camera system at the first position and a second heading of the camera system at the second position, based on images of the plurality of targets; estimate height position of targets based on estimates of relative heading orientations and images of the plurality of targets; calculate initial target locations using a distance between the first position and the second position, relative heading orientations of the camera system at the first position and at the second position, and images of the plurality of targets acquired by the camera system while the camera system was at the first position and at the second position; calculate initial locations of the one or more other positions based on the initial target locations and images of the plurality of targets acquired by the camera system while the camera system was at the one or more other positions; and/or calculate actual locations of the plurality of positions and actual target locations by running bundle adjustment with initial locations of the one or more other positions and initial target locations as initial values for the bundle adjustment.

In some embodiments, a method for determining relative heading orientations of a camera system at two positions comprises: placing the camera system at a first position and at a second position; determining a distance between the first position and the second position; calculating a first plurality of target rays and a second plurality of target rays, wherein: the camera system comprises a plurality of image sensors, the plurality of image sensors are arranged about a center of the camera system, each target ray is generated by determining a ray modeled to start from the center of the camera system and toward a target imaged by an image sensor of the plurality of image sensors, the target ray is projected as a line on a two-dimensional plane, the first plurality of target rays correspond to target locations while the camera system is at the first position, the first plurality of target rays extend from a first center of a first coordinate system, the second plurality of target rays correspond to target locations while the camera system is at the second position, the second plurality of target rays extend from a second center of a second coordinate system, and/or the first center is modeled to be separated from the second center by the distance between the first position and the second position; and/or rotating the second coordinate system about an axis orthogonal to the two-dimensional plane to maximize a number of intersecting target rays on a two-dimensional plane, wherein intersecting target rays correspond to the same target. In some embodiments, the method can further comprise determining a range of headings that maximize the number of intersecting target rays; and/or estimating heights of targets by averaging rays from the first plurality of target rays and the second plurality of target rays for each target, wherein height is measured in a direction normal to the two-dimensional plane.

Further areas of applicability of the present disclosure will become apparent from the detailed description provided hereinafter. It should be understood that the detailed description and specific examples, while indicating various embodiments, are intended for purposes of illustration only and are not intended to limit the scope of the disclosure.

BRIEF DESCRIPTION OF THE DRAWINGS

The present disclosure is described in conjunction with the appended figures.

Figure 1:
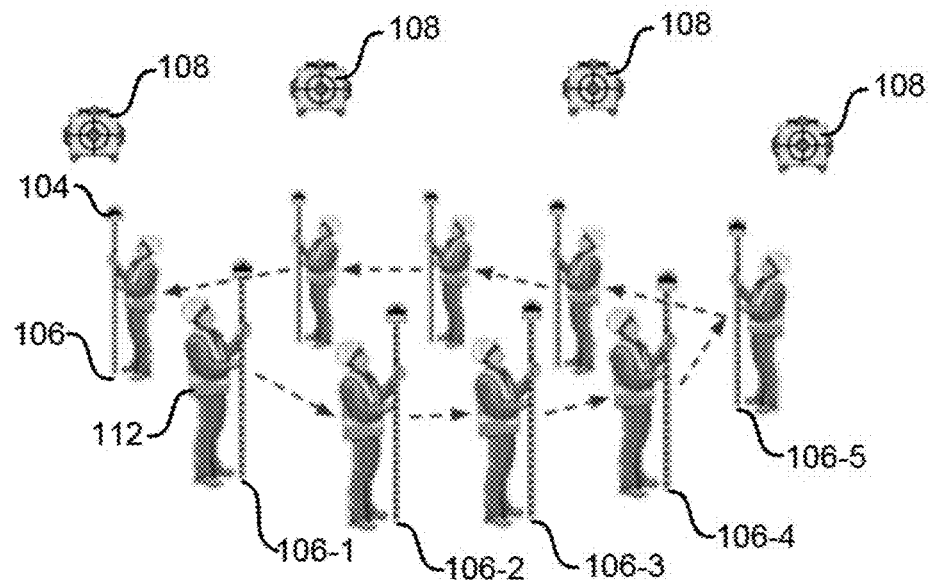
FIG. 1 depicts a simplified drawing of an embodiment of placing a camera system at a plurality of positions.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

A Position and Orientation Measurement Engine (POME) is a mobile camera system that can be used for accurate indoor measurement (e.g., at a construction site). The POME comprises a plurality of cameras (e.g., 3, 4, 5, or 10) and uses a plurality of targets to determine a location of the POME. Each camera of the plurality of cameras comprises an image sensor. Camera centers and relative orientation of image sensors of cameras are known relative to each other. Image coordinates (e.g., image location of a target on an image sensor) can be used with known camera centers, known relative orientations of the plurality of cameras that are part of the POME 104, and known locations of targets (e.g., targets are stationary) to determine a position of the POME 104. Precise location of the POME is dependent on knowing precise locations of the plurality of targets. One way to precisely know target locations is by surveying target locations, such as using a total station to determine precise target location. However, surveying target locations can take time, require specialized skills, and/or use expensive equipment. For example, a total station can be five times or more the cost of a POME. It would be beneficial to have a more efficient and/or cost-effect way to determine precise target locations without having to manually survey the target locations and/or use a total station to survey target locations.

In some embodiments, a way to more efficiently, less expensively, and/or more simply determine precise target locations is to use the POME itself (e.g., with an optimization algorithm and/or bundle adjustment) to determine target locations. Bundle adjustment is a technique that uses a plurality of initial conditions to converge to a solution. For example, initial conditions for POME placement can be used as inputs for bundle adjustment to determine precise target locations. Applicant has found that if initial conditions are not close enough to actual positions, using bundle adjustment does not converge to a meaningful solution. Accordingly, in some embodiments techniques are used to obtain initial conditions to an accuracy that allows bundle adjustment to converge to a solution. Thus targets can be set up and positioned without tools (e.g., a total station) external to the POME.

Referring first to FIG. 1, a simplified drawing of an embodiment of placing a camera system (e.g., a POME 104) at a plurality of positions 106 to calibrate locations for a plurality of targets 108 is shown. Targets 108 are placed at various locations. Locations of targets 108 are not precisely known initially. The POME 104 is moved around to different positions 106. The POME 104 takes pictures of targets 108 while at the different positions 106. In some embodiments, a user 112 walks the POME 104 around while the POME 104 takes dozens, hundreds, or thousands of images of the targets 108. For example, the user 112 moves the POME 104 to a first position 106-1; the POME 104 takes one or more images of targets 108 while at the first position 106-1. The user 112 moves the POME 104 to a second position 106-2; the POME 104 takes one or more images of targets 108 while at the second position 106-2. The user 112 moves the POME 104 to a third position 106-3; the POME 104 takes one or more images of targets 108 while at the third position 106-3. The user 112 moves the POME 104 to a fourth position 106-4; the POME 104 takes one or more images of targets 108 while at the fourth position 106-4. The user 112 moves the POME 104 to a fifth position 106-5; the POME 104 takes one or more images of targets 108 while at the fifth position 106-5, and so on at 6, 10, 15, or more positions 106. In some embodiments, the POME 104 is set at less than 10, 20, 50, or 100 positions 106 for determining locations of targets 108.

In some embodiments, the user 112 pauses the POME 104 at each position (e.g., and resting the POME 104 on the ground to steady the POME 104 while the POME 104 acquires one or more images). In some embodiments, a target 108 is an IR target that emits an infrared signal. The target 108 can be a visual target (e.g., a pattern of contrasting colors and/or a pattern of contrasting grayscale, such as a black and white pattern). In some embodiments, a natural or man-made feature is used as a target (e.g., a fence post, a column, a corner of a building, a rock formation, etc.). Targets can be uniquely identifiable to the POME 104 (e.g., targets emit a unique IR signal and/or have a unique visual pattern). A target could be a piece of paper (e.g., with a number written on it). A target 108 could use synchronized flashing to be uniquely identified. Targets could comprise LEDs of unique color and/or flashing pattern. In some embodiments, one target is unique and other targets are known in relation to the one target that is unique, thus all targets can be uniquely identified. In some embodiments, targets are not unique and/or the POME 104 is rotated in a hemisphere while acquiring images to establish a relationship between targets 108 to identify targets 108.

Figure 2:
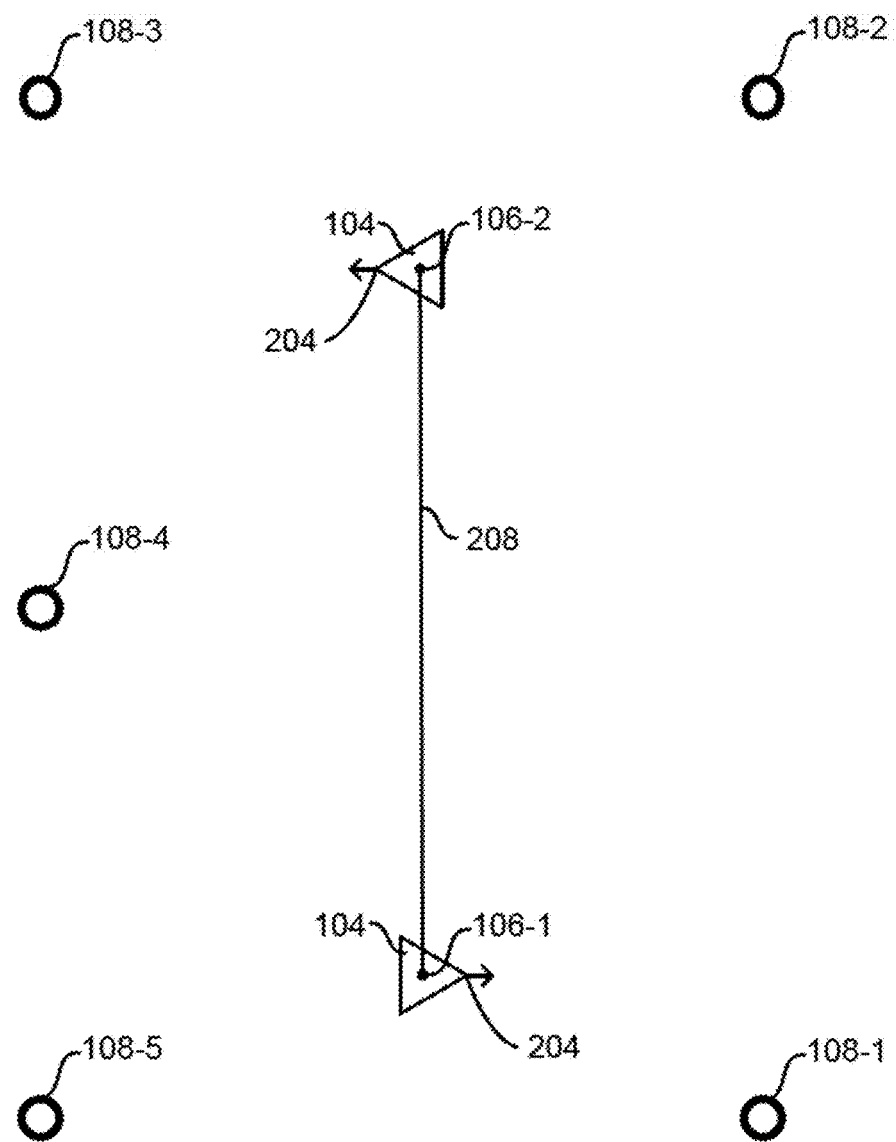
FIG. 2 depicts a simplified drawing of a top view of a first position and a second position of the camera system in relation to a plurality of targets.

FIG. 2 depicts a simplified drawing of a top view of the POME 104 at the first position 106-1 and at the second position 106-2 in relation to a first target 108-1, a second target 108-2, a third target 108-3, a fourth target 108-4, and a fifth target 108-5. The POME 104 has a front 204 from which a heading of the POME 104 is measured. The heading can be an arbitrary, yet a consistent direction in relation to cameras of the POME 104. A distance between the first position 106-1 and the second position 106-2 is used as a baseline 208. The baseline 208 can be determined several ways. For example, the baseline can be determined by measuring the distance between the first position 106-1 and the second position 106-2 (e.g., with a ruler or a tape measure); by an electronic measuring device (EDM); by using a rod of known dimensions and taking a picture of the rod with the POME 104 while the POME is at the second position 106-2 and the rod is at the first position 106-1; moving the POME 104 in a partial hemisphere; and/or placing the POME 104 at known positions (e.g., measuring a distance between two points in a CAD model and placing the POME 104 at positions corresponding to the two points in the CAD model).

Figure 3:
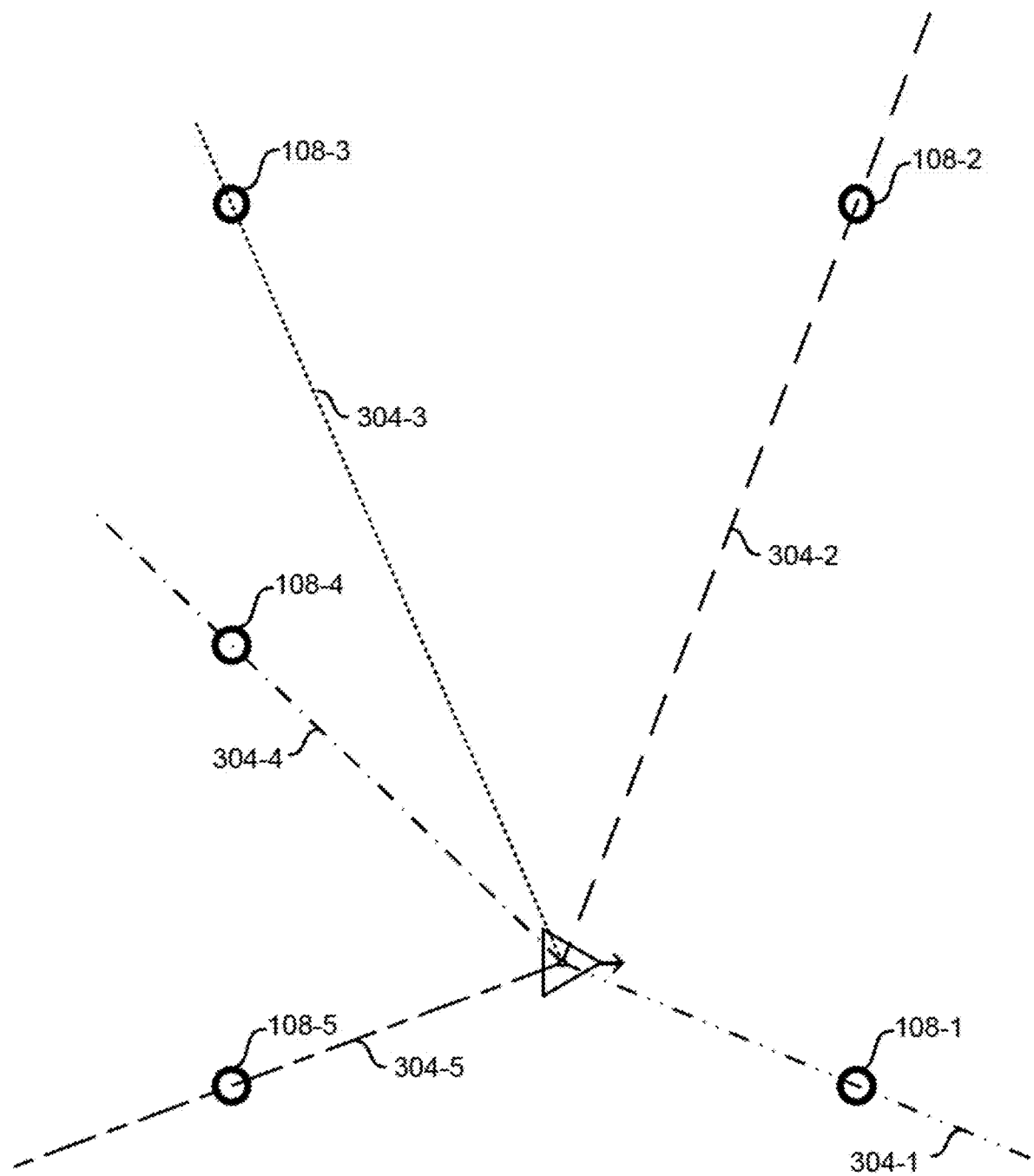
FIG. 3 depicts a simplified drawing of an embodiment of target rays calculated in relation to a center of the camera system.

FIG. 3 depicts a simplified drawing of an embodiment of target rays 304 calculated in relation to a center of the camera system (e.g., the POME 104). FIG. 3 shows a first target ray 304-1 extending from the POME 104 to the first target 108-1; a second target ray 304-2 extending from the POME 104 to the second target 108-2; a third target ray 304-3 extending from the POME 104 to the third target 108-3; a fourth target ray 304-4 extending from the POME 104 to the fourth target 108-4; and a fifth target ray 304-5 extending from the POME 104 to the fifth target 108-5.

A target ray 304 is an imaginary line from the center of the POME 104 at a position 106 to a target 108. The target ray 304 can be calculated based on the center of the POME 104 in relation to an image of a target formed on an image sensor and a camera center of the image sensor. Target rays 304 are calculated in a local coordinate system of the POME 104. In FIG. 3, target rays 304 are projected onto an x/y plane. The x/y plane is a two-dimensional plane.

Target rays 304 of the POME 104 while the POME 104 is at the first position 106-1 are calculated in a first coordinate system. Target rays 304 of the POME 104 while the POME is at the second position 106-2 are calculated in a second coordinate system. The second coordinate system is separated from the first coordinate system by the baseline 208 distance in a combined coordinate system. In the combined coordinate system, the first position 106-1 is the origin and the second position 106-2 is on the positive y axis.

The POME 104 is moved to positions 106 while reducing and/or minimizing pitch and roll of the POME 104, and while allowing yaw (rotation around the z axis; change in heading by change in direction of the front 204 of the POME 104) to vary. Pitch and roll can be reduced and/or minimized by standing the POME 104 on a tripod or by mounting the POME 104 to a staff (e.g., a pole), having the user rest the staff on the ground, and/or have the user keep the staff straight up and down (e.g., parallel to the z axis at the first position 106-1, at the second position 106-2, and/or at other positions 106). In some embodiments, roll and/or pitch of the POME 104 change less than 5, 10 or 15 degrees between the first position 106-1 and the second position 106-2 (e.g., the pitch and/or roll of the POME 104 at the first position 106-1 is similar to the pitch and/or roll of the POME 104 in the second position). In some embodiments, roll and pitch are assumed to be zero for calculating target rays 304.

Figure 4:
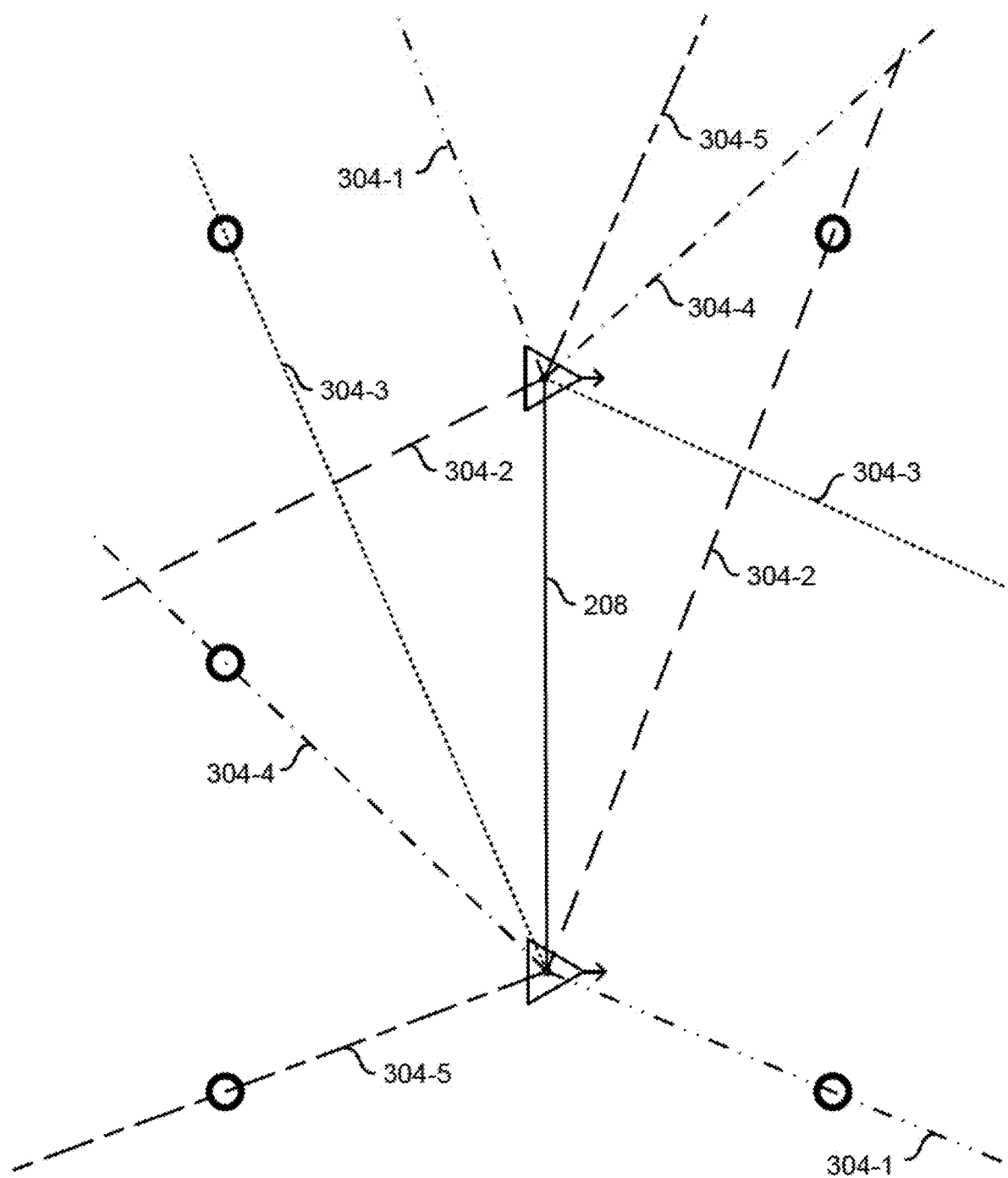
FIG. 4 depicts an embodiment of target rays of the camera system at the first position and at the second position, wherein orientation of the camera system at the second position is unknown in relation to an orientation of the camera system at the first position.

FIG. 4 depicts an embodiment of target rays 304 of the POME 104 at the first position 106-1 and at the second position 106-2, wherein orientation of the POME 104 at the second position 106-2 is unknown in relation to orientation of the camera system at the first position 106-1. Target rays 304 are calculated with the assumption that the POME 104 heading at the second position 106-2 is the same heading of the POME 104 at the first position 106-1. Target rays 304 are calculated for the POME 104 at both the first position 106-1 and at the second position 106-2 in the combined coordinate system. Corresponding rays are target rays 304 to the same target 108, but calculated at different positions 106 of the POME 104. For example, the first target ray 304-1 of the POME in the first position 106-1 and the first target ray 304-1 of the POME 104 at the second position 106-2 are corresponding rays (corresponding rays have the same line pattern in the figures). Having unique targets can help identify corresponding target rays.

In FIG. 4, corresponding rays do not intersect. Corresponding rays do not intersect because the assumption is incorrect that the POME 104 at the second position 106-2 had a similar heading while the POME 104 was at the first position 106-1. Accordingly, calculations are performed to rotate target rays 304 of the POME 104 at the second position 106-2 so that there is a maximum of corresponding rays that intersect. Target rays 304 while the POME 104 is at the first position 106-1 are calculated in a first coordinate system. Target rays 304 of while the POME 104 is at the second position 106-2 are calculated in a second coordinate system. An origin of the second coordinate system is separated from an origin of the first coordinate by the baseline 208. A z axis of the second coordinate system is parallel with a z axis of the first coordinate system, and the x/y plane of the second coordinate system is coplanar with the x/y plane of the first coordinate system. The second coordinate system is rotated in relation to the first coordinate system (e.g., about the z axis of the second coordinate system) to maximize a number of intersections of corresponding rays. Maximizing the number of intersections of corresponding rays can be used to estimate the heading of the POME 104 at the second position 106-2 in relation to the POME 104 while at the first position 106-1, and is further described below.

Figure 5:
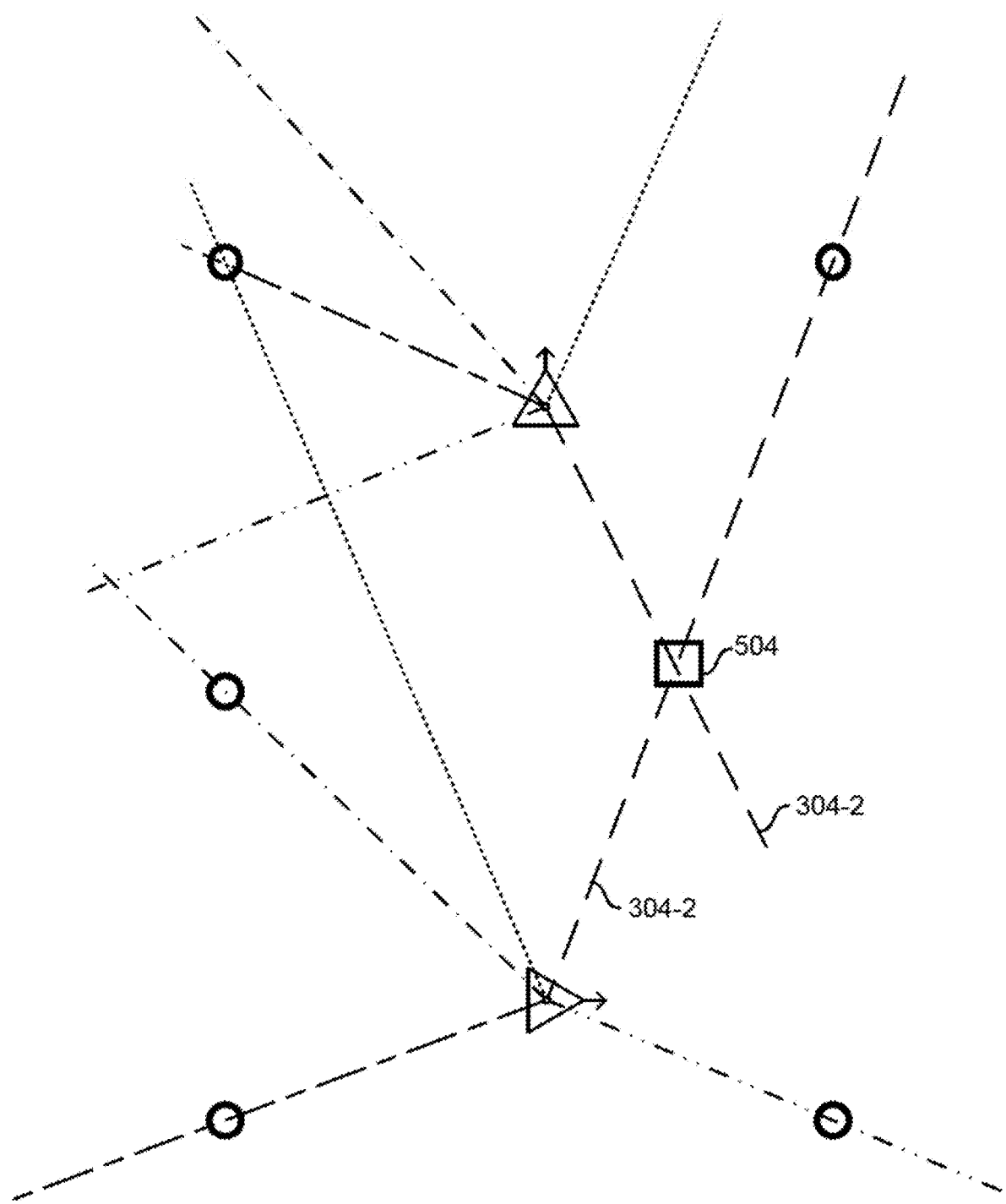
FIG. 5 illustrates an example of rotation of a second coordinate system in relation to a first coordinate system.

FIG. 5 illustrates an example of rotation of the second coordinate system in relation to the first coordinate system. In FIG. 5, the second coordinate system has been rotated 90 degrees counterclockwise in relation to the first coordinate system. Having rotated the second coordinate system, there is one intersection 504 of corresponding rays: the second target ray 304-2 of the first coordinate system crosses the second target ray 304-2 of the second coordinate system at intersection 504 in FIG. 5. No other corresponding target rays 304 intersect. Accordingly, there is only one intersection 504 while the second coordinate system is rotated 90 degrees counterclockwise in relation to the first coordinate system.

Figure 6:
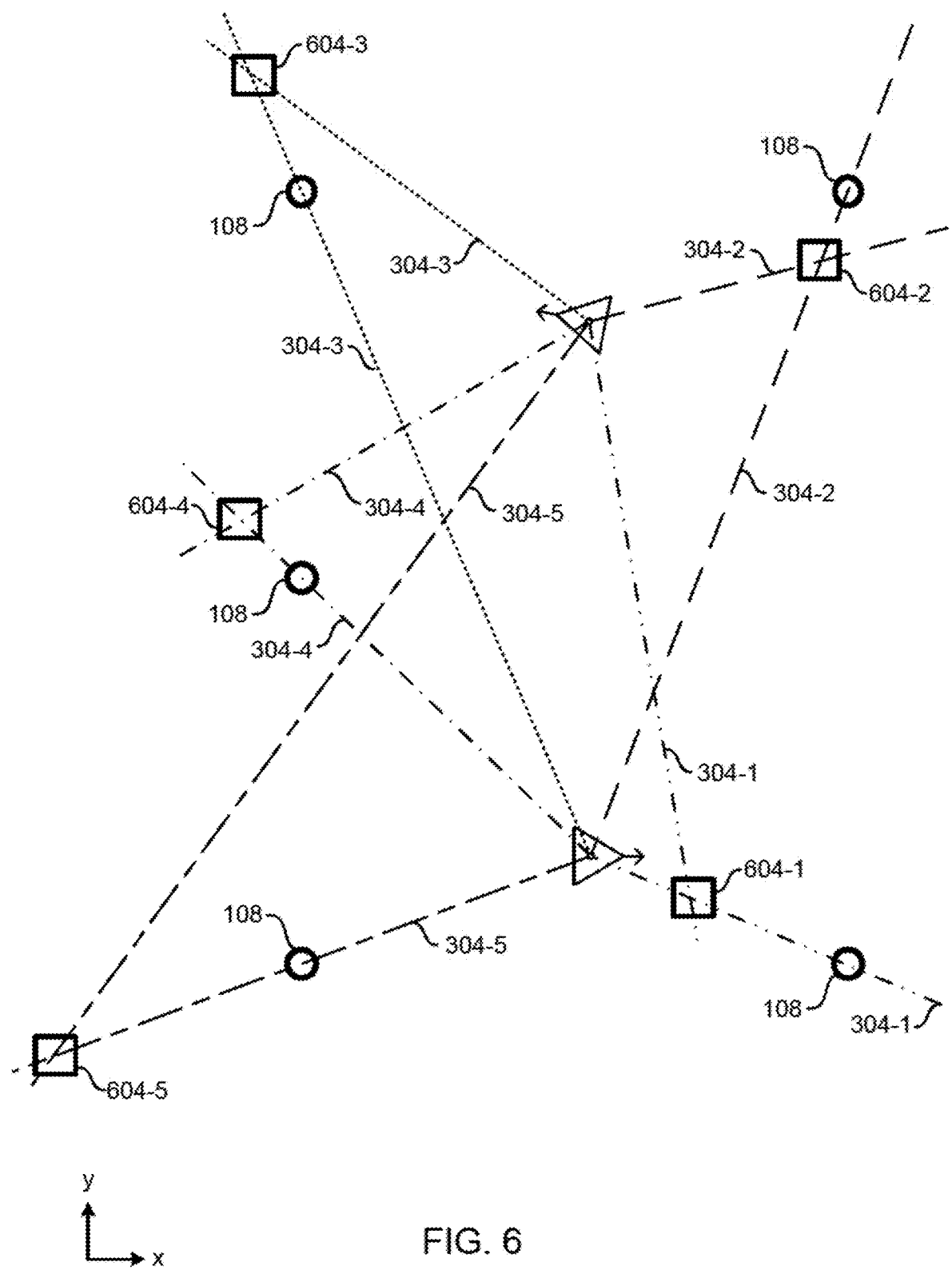
FIGS. 6 and 7 illustrate variance in orientation of the second coordinate system in relation to the first coordinate system of an embodiment having a maximum of intersecting target rays.
Figure 7:
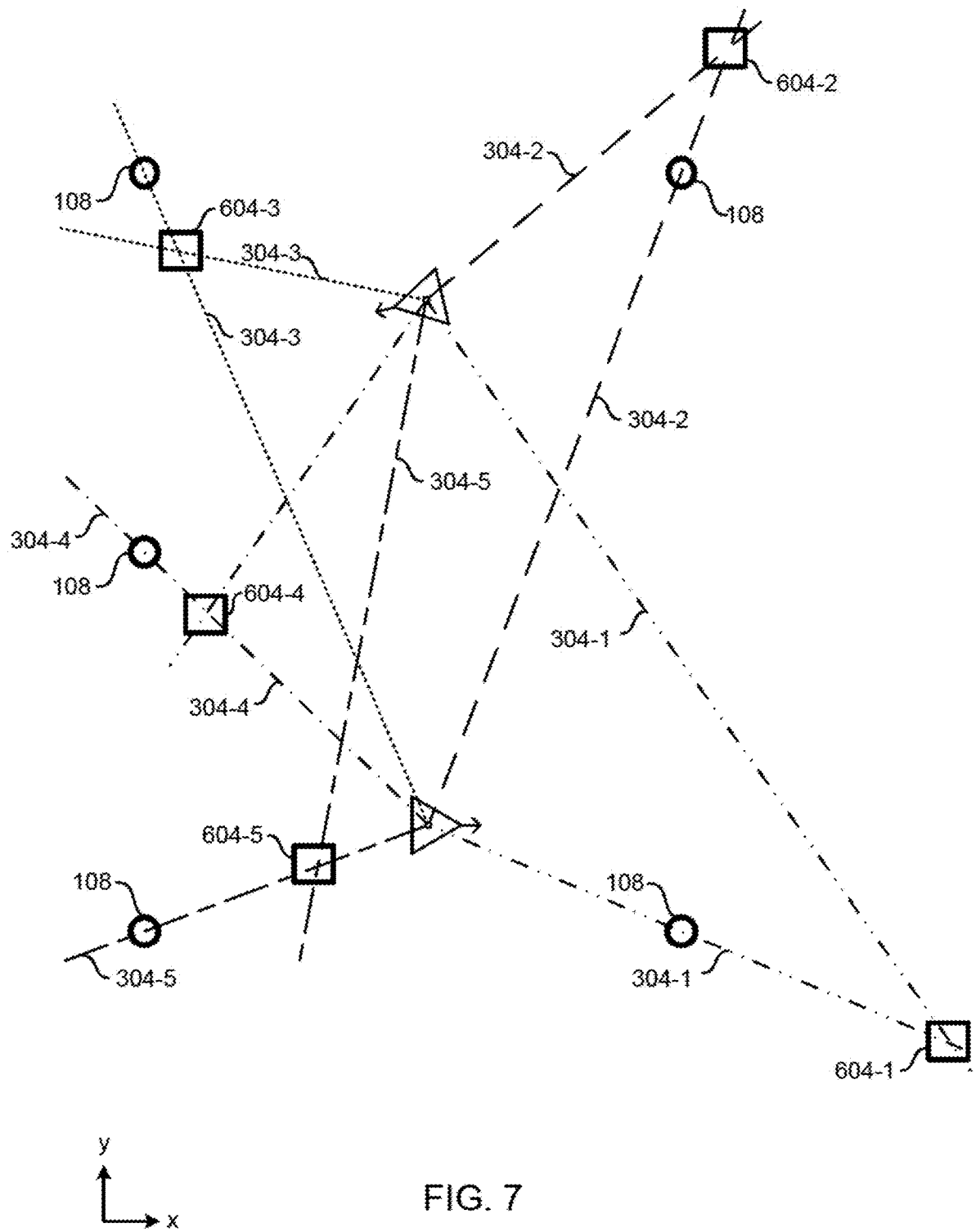

FIGS. 6 and 7 illustrate variance in orientation of the second coordinate system in relation to the first coordinate system of an embodiment having a maximum of intersecting target rays. In FIG. 6, the second coordinate system is rotated 168 degrees counterclockwise in relation to the first coordinate system. In FIG. 7, the second coordinate system is rotated 193 degrees counterclockwise in relation to the first coordinate system; 25 degrees counterclockwise in relation to FIG. 6. In both FIG. 6 and FIG. 7, there are five intersections 604 of corresponding target rays 304. A rotation of less than about 168 degrees has less than five intersections 604 of corresponding target rays 304, and a rotation of more than about 193 degrees has less than five intersections 604 of corresponding target rays 304.

A first intersection 604-1 is where the first target rays 304-1 cross. A second intersection 604-2 is where the second target rays 304-2 cross. A third intersection 604-3 is where the third target rays 304-3 cross. A fourth intersection 604-4 is where the fourth target rays 304-4 cross. A fifth intersection 604-5 is where the fifth target rays 304-5 cross.

The maximum number of intersections 604 in FIGS. 6 and 7 is five because there are five targets 108. The maximum number of intersections 604 is not more than the number of targets 108. In some embodiments, the maximum number of intersections 604 is less than the number of targets 108 because one or more targets 108 are not observed by the POME 104, while the POME 104 is at either the first position 106-1 or at the second position 106-2.

A minimum angle is a first angle of rotation of the second coordinate system in relation to the first coordinate system that results in the maximum number of intersections 604. A maximum angle is a last angle of rotation of the second coordinate system in relation to the first coordinate system that results in the maximum number of intersections 604. In the embodiment shown in FIGS. 6 and 7, 168 degrees corresponds to the minimum angle having the maximum number of intersections 604, and 193 degrees corresponds to a maximum angle having the maximum number of intersections 604. An average angle is an average value of the minimum angle and the maximum angle. The average angle is an estimate of the front 204 of the POME 104 while the POME 104 is at the second position 106-2. In some embodiments, a range of headings, which forms an error range, is from the minimum angle to the maximum angle. In some embodiments, the error range is the average angle plus and minus one quarter of the difference between the maximum angle and the minimum angle.

The intersections 604 are estimates, in the x/y plane, for locations of targets 108 while the second coordinate system is rotated to the average angle in relation to the first coordinate system. For example, the first target 108-1 is estimated to be at $(X_1, Y_1)$, where $X_1$ is the estimated x value of the location of the first target 108-1, and $Y_1$ is the estimated y value of the location of the first target 108-1. The second target 108-2 is estimated to be at $(X_2, Y_2)$, and so on.

Figure 8:
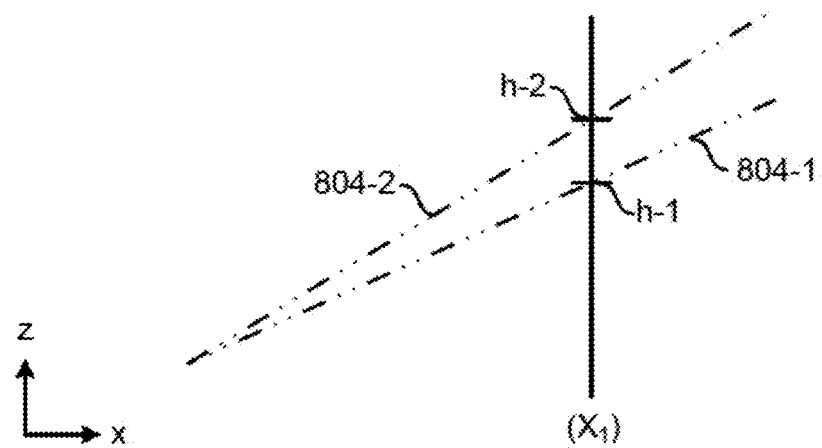
FIG. 8 illustrates an example of calculating heights of targets based on target rays.

FIG. 8 illustrates an example of estimating heights of targets 108 (e.g., z value) based on corresponding target rays. After estimates of locations of targets 108 in two dimensions are generated (e.g., estimates (X, Y) for three or more targets 108), estimates for heights (Z) of targets 108 are calculated. In some embodiments, heights of targets 108 are estimated based on an average z value of corresponding target rays 304 at X and/or Y.

FIG. 8 depicts a first ray 804-1 and a second ray 804-2 in the x/z plane. The first ray 804-1 is the first target ray 304-1 calculated for while the POME 104 was at the first position 106-1. The second ray 804-2 is the first target ray 304-1 calculated for while the POME 104 was at the second position 106-2 and oriented at the average angle in relation to the POME 104 at the first position 106-1. The first ray 804-1 has a first height h-1 at $X_1$. The second ray 804-2 has a second height h-2 at $X_1$. An estimated z value $(Z_1)$ of the location of the first target 108-1 is calculated by finding an average of the first height h-1 and the second height h-2. Estimated z values (Z) for locations of three or more targets 108 are calculated and combined with the x and y estimated values to obtain (X, Y, Z) for the three or more targets 108. For example estimated z values are calculated for the first through fifth targets, and estimated values for five targets are obtained. For example, estimated values $(X_1, Y_1, Z_1)$ of the location for the first target 108-1, estimated values $(X_2, Y_2, Z_2)$ of the location for the second target 108-2, estimated values $(X_3, Y_3, Z_3)$ of the location for the third target 108-3, estimated values $(X_4, Y_4, Z_4)$ of the location for the fourth target 108-4, and estimated values $(X_5, Y_5, Z_5)$ of the location for the fifth target 108-5 are obtained (e.g., in the combined coordinate system having the baseline 208 define they y axis and the first position 106-1 as the origin).

After estimated values (X, Y, Z) are determined for locations of targets 108, values are optimized (e.g., in a restricted solution space), to obtain initial values (X', Y', Z') for locations of targets 108 and/or an initial value of the second position 106-2 in relation to the first position 106-1 (e.g., a revised/more precise value for the distance of the baseline 208). For example, initial values (X', Y', Z') are calculated using the distance between the first position 106-1 and the second position 106-2 (e.g., the baseline 208), relative heading orientations of the POME 104 at the first position 106-1 and at the second position 106-2 (e.g., angles between the minimum angle and the maximum angle within the error range of angles), and images of the targets 108 acquired by the camera system while the POME 104 was at the first position 106-1 and while the POME 104 was at the second position 106-2 (e.g., using collinearity equations and/or target rays 304).

The initial values (X', Y', Z') of locations of targets 108 are used to calculate initial values (e.g., (x, y, z)) of one or more positions 106 other than the first position 106-1 and the second position 106-2. For example, initial values (X', Y', Z') of locations of targets 108 are used to calculate (x, y, z) of the third position 106-3, the fourth position 106-4, and the fifth position 106-5.

In some embodiments, initial values (X', Y', Z') for locations of targets 108 can be used for determining a position of the POME 104. For example, Applicant has found that using initial values (X', Y', Z') of locations of targets 108 can be used to determine the position of the POME 104 to about a half meter. To increase precision (e.g., to equal to or less than 0.1, 0.3, 0.5, 1, 2, 5, 10, 20, 40, and/or 45 centimeters), further refinement to locations of targets 108 is performed. In some embodiments, calculating actual locations of the positions 106 and/or actual locations of targets 108 is done using bundle adjustment using initial values (X', Y', Z') of locations of targets 108, the initial value of the second position 106-2 in relation to the first position 106-1, and/or initial values of other positions 106.

Figure 9:
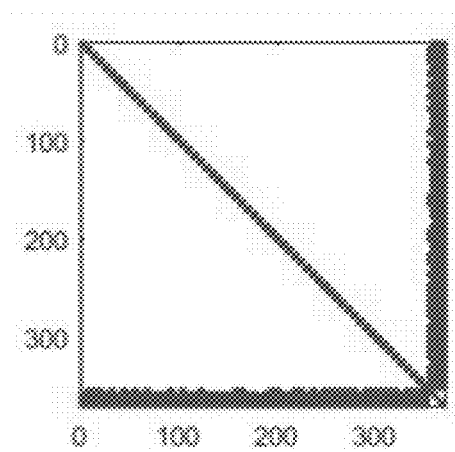
FIG. 9 depicts a sample matrix generated using bundle adjustment.

FIG. 9 depicts a sample matrix generated using bundle adjustment. Known variables can include image coordinate measurements (coordinates on image sensors) for targets from the POME 104 while the camera system is at the plurality of positions 106 and the baseline 208 distance. Unknown variables can include the locations in three dimensions (e.g., in x, y, and z) of the targets 108, wherein the initial values (X', Y', Z') are used with 1 sigma=+/−2 meters; and EOP (exterior orientation parameters) of the POME 104 at the different positions 106 with 1 sigma for angle=+/−30 degrees and 1 sigma for position=+/−0.5 meters.

A Jacobian matrix can be formed having a number of rows equal to double a number of image coordinates measurements. Columns can be formed by having a number of columns equal to five (for five EOP of the POME 104 at the second position 106-2); plus a number of positions 106 minus two (taking out the first position 106-1 and the second position 106-2), the difference being multiplied by six (for six EOP of the POME 104 per position); plus a number of targets 108 multiplied by three (for three position variables). Assumptions can include: (1) six degrees of freedom of the POME 104 at the first position 106-1 are [0 0 0 0 0 0]; and (2) six degrees of freedom the camera system at the second position 106-2 are [Ω φ κ M d O], where d is the distance of the baseline 208 (an arbitrary distance, but known from a measurement), Ω φ and κ are unknown angles, M and O are unknowns and correspond to x position and z position respectively.

The sample matrix in FIG. 9 is a normal matrix with solutions to unknowns. In some embodiments, in comparing actual values calculated using bundle adjustment to surveyed values, actual values are generally within 3 to 15 millimeters of the surveyed values. In some embodiments, an actual value is a value within 0.2, 0.5, 1, 2, 5, 10, 15, 25, and/or 30 centimeters of an absolute value, wherein an absolute value is a value that is free from imperfection.

Figure 10:
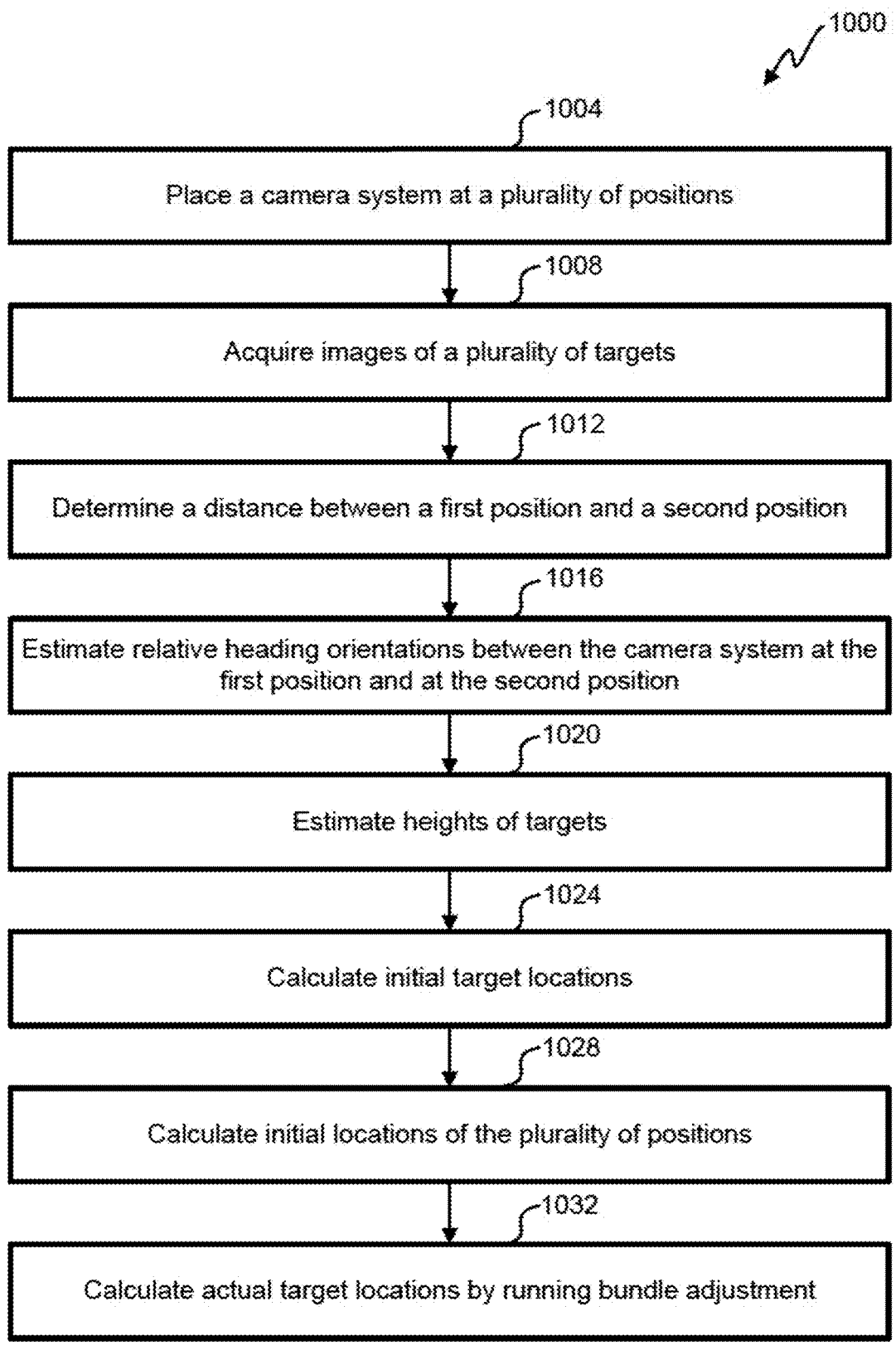
FIG. 10 illustrates a flowchart of an embodiment of a process for determining target locations using bundle adjustment.

FIG. 10 illustrates a flowchart of an embodiment of a process 1000 for determining target locations using bundle adjustment. Process 1000 begins in step 1004 with placing a camera system (e.g., POME 104) at a plurality of positions 106. The plurality of positions 106 includes a first position (e.g., the first position 106-1), a second position (e.g., the second position 106-2), and one or more other positions (e.g., positions 106 besides the first position 106-1 and the second position 106-2). Images of a plurality of targets 108 are acquired using the camera system (e.g., while the camera system is stationary at each of the plurality of positions 106). In some embodiments, a user waits from 2 to 20 seconds (e.g., 10 to 15 seconds) at each position 106 for the camera system to take pictures (e.g., for the POME 104 to stop oscillating). In some embodiments, the camera system takes video, and the camera system compares sequential images to determine when the camera system is stable (and/or indicates to the user with a light and/or sound that the user can move to another position). In some embodiments, the user limits movement of the camera system in two degrees of rotational freedom (e.g., limits pitch and roll of the camera system so that the POME 104 has effectively the same pitch and roll; in calculations, it is assumed that roll and/or pitch of the POME 104 do not change between the first position 106-1 and the second position 106-2). The user can move randomly to a plurality of positions (e.g., the positions are random positions) and take pictures of targets 108 at the plurality of positions.

In step 1012, a distance between the first position and the second position is determined. For example, the baseline 208 is measured using a tape measure.

In step 1016, a relative heading orientation between the camera system at the first position and the camera system at the second position is estimated. For example, target rays 304 are calculated, the second coordinate system of the POME 104 at the second position 106-2 is rotated in relation to the first coordinate system of the camera system at the first position, and a maximum number of intersections of corresponding target rays 304 is found (e.g., as discussed in conjunction with FIGS. 3-7). Target rays 304 are calculated based images of the plurality of targets taken by the camera system (e.g., forming a ray from a camera center though a point in image coordinates corresponding to an image of the target).

In step 1020, heights of targets are estimated. For example, heights of target rays 304 are projected onto an x/z plane and/or a y/z plane and averaged at an x and/or a y coordinate (e.g., as discussed in conjunction with FIG. 8).

In step 1024, initial target locations are calculated (e.g., to obtain initial values (X', Y', Z')). For example, the distance between the first position and the second position, the relative heading orientation of the camera system at the second position in relation to the heading of the camera system at the first position, and locations of targets on image sensor(s) of the camera system while the camera system is at the first location and at the second location are used to optimize locations of the targets. Optimization can be calculated in a restricted solution space (e.g., heading of the POME 104 while the POME 104 is at the second position 106-2 could be limited to the minimum angle and the maximum angle discussed in FIGS. 6 & 7). In some embodiments, an optimization routine optimizes six degrees of freedom of the POME 104 at the plurality of positions 106 (or a subset of the plurality of positions 106) and/or optimizes locations of targets (or a subset of targets) in three dimensions.

After initial target locations are calculated, initial locations of the plurality of positions 106 are calculated based on the initial target locations, step 1028. For example, images of targets from the camera system while the camera system was at a third position are used to calculate an initial location of the third position. In some embodiments, having initial locations is sufficient (e.g., depending on the precision desired).

In some embodiments, missing targets are added by determining initial locations for the missing targets. A missing target is a target that is not observed by the POME 104 at both the first position 106-1 and at the second position 106-2. For example, a target between the first target 108-1 and the second target 108-2 (e.g., having the same x value as the first target 108-1 and the same y value as the fourth target 108-4) could be observed by the POME 104 while at the first position 106-1 and obscured by a pillar while the POME 104 is at the second position 106-2. Missing targets are added in by triangulating a location of a missing target using images of the target taken by the POME 104 at two, three, or more positions (e.g., two positions might be used if trying to place the missing target in only two dimensions). In some embodiments, the POME 104 is moved to a later position, during calibration, where the POME 104 identifies targets that are not observed while the POME 104 is at the first position 106-1 or the second position 106-2, and/or the POME 104 at the later position does not observe any targets observed by the POME 104 while at the first position 106-1 and/or at the second position 106-2 (e.g., the POME 104 at each position observes some of the same targets as the POME 104 while at a previous position). Thus one baseline 208 can be used to calibrate targets in a relatively large area.

Actual target locations can be calculated using bundle adjustment, step 1032, to get higher accuracy of target locations (e.g., as compared to initial target locations). The initial locations of the targets and initial positions of the camera system at the one or more other positions are used as initial estimates (e.g., initial values) for bundle adjustment. In some embodiments, initial positions of the first position 106-1 and/or of the second position 106-2 are also used. By taking steps to determine the initial locations and the initial positions (e.g., as described above), bundle adjustment is able to converge to a solution. After actual target locations are known, the POME 104 can be used to precisely determine positions (e.g., for power tools at a construction site).

Figure 11:
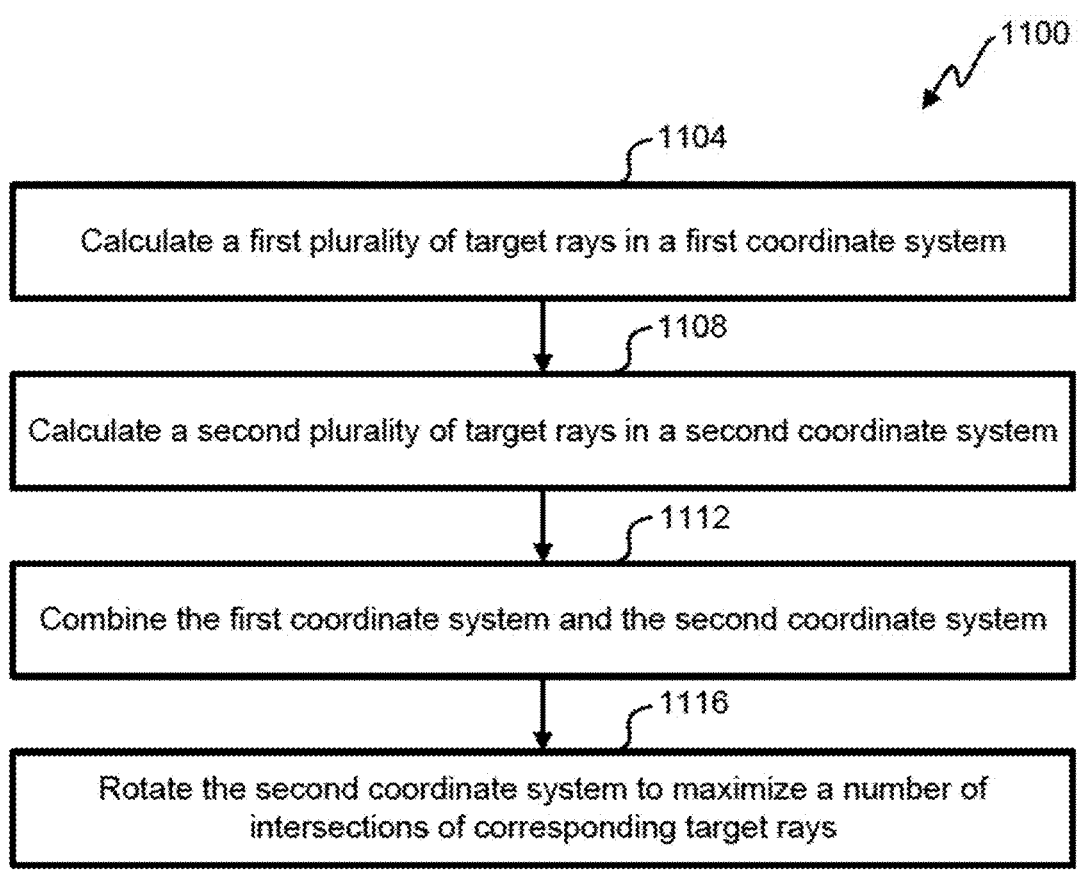
FIG. 11 illustrates a flowchart of an embodiment of a process for determining relative heading orientations of a camera system at two positions.

FIG. 11 illustrates a flowchart of an embodiment of a process 1100 for determining relative heading orientations of a camera system at two positions. Process 1100 begins in step 1104 with calculating a first plurality of target rays in a first coordinate system. Target locations in the first coordinate system are based on target positions in images taken while the POME 104 was at the first position 106-1. The first plurality of target rays correspond to relative target locations while the camera system is at the first position. In step 1108, a second plurality of target rays are calculated in a second coordinate system. Target locations in the second coordinate system are based on target positions in images taken while the POME 104 was at the second position 106-2. The second plurality of target rays correspond to relative target locations while the camera system is at the second position.

The first coordinate system and the second coordinate system are combined on a common plane (e.g., the x/y plane), step 1112, and origins of the first coordinate system and the second coordinate system separated by a distance of the baseline 208. The second coordinate system is rotated in relation to the first coordinate system to maximize a number of intersections of corresponding target rays (e.g., as described in conjunction with FIGS. 4-7).

Figure 12:
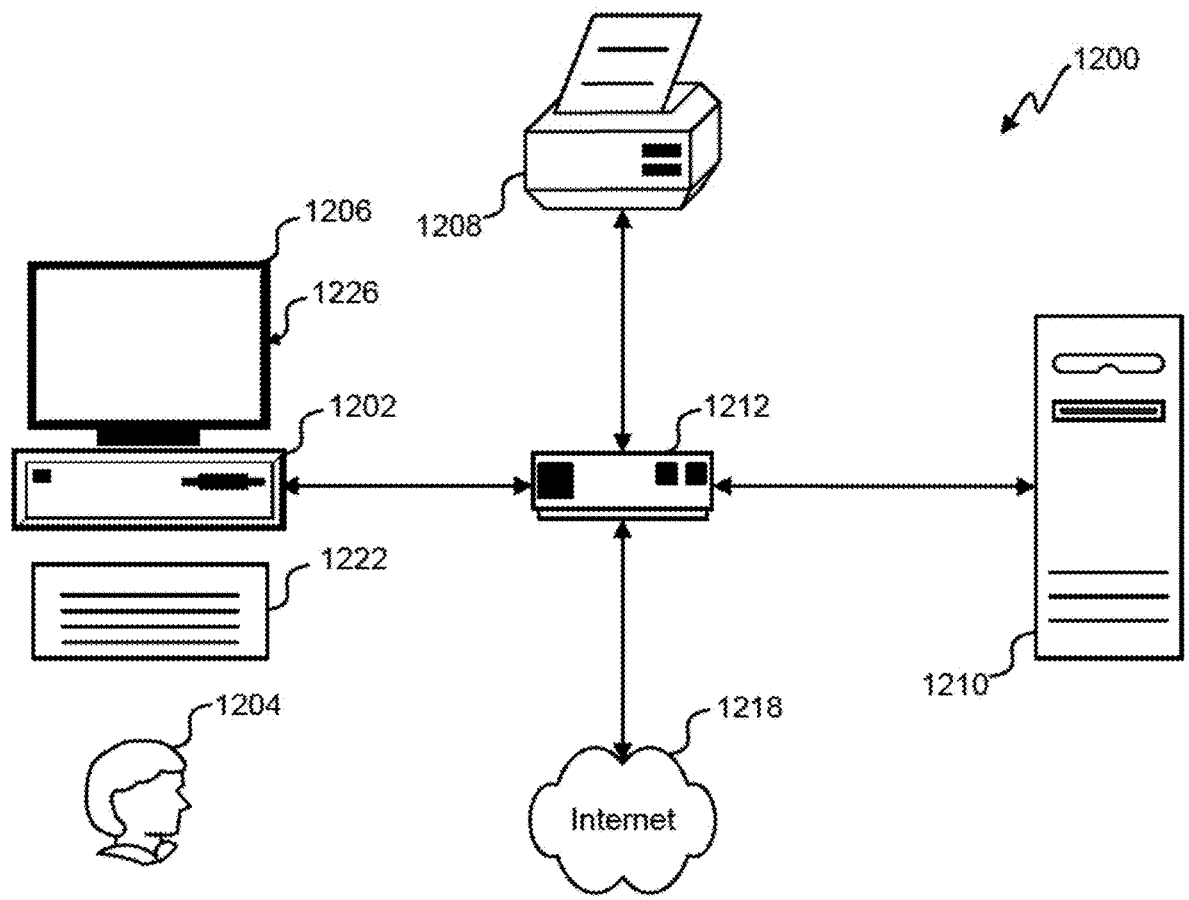
FIG. 12 depicts a block diagram of an embodiment of a computer system.

Referring next to FIG. 12, an exemplary environment with which embodiments may be implemented is shown with a computer system 1200 that can be used by a designer 1204 to design, for example, electronic designs. The computer system 1200 can include a computer 1202, keyboard 1222, a network router 1212, a printer 1208, and a monitor 1206. The monitor 1206, processor 1202 and keyboard 1222 are part of a computer system, which can be a laptop computer, desktop computer, handheld computer, mainframe computer, etc. The monitor 1206 can be a CRT, flat screen, etc.

A designer 1204 can input commands into the computer 1202 using various input devices, such as a mouse, keyboard 1222, track ball, touch screen, etc. If the computer system 1200 comprises a mainframe, a designer 1204 can access the computer 1202 using, for example, a terminal or terminal interface. Additionally, the computer 1202 may be connected to a printer 1208 and a server 1210 using a network router 1212, which may connect to the Internet 1218 or a WAN.

The server 1210 may, for example, be used to store additional software programs and data. In one embodiment, software implementing the systems and methods described herein can be stored on a storage medium in the server 1210. Thus, the software can be run from the storage medium in the server 1210. In another embodiment, software implementing the systems and methods described herein can be stored on a storage medium in the computer 1202. Thus, the software can be run from the storage medium in the computer 1202. Therefore, in this embodiment, the software can be used whether or not computer 1202 is connected to network router 1212. Printer 1208 may be connected directly to computer 1202, in which case, the computer system 1200 can print whether or not it is connected to network router 1212.

Figure 13:
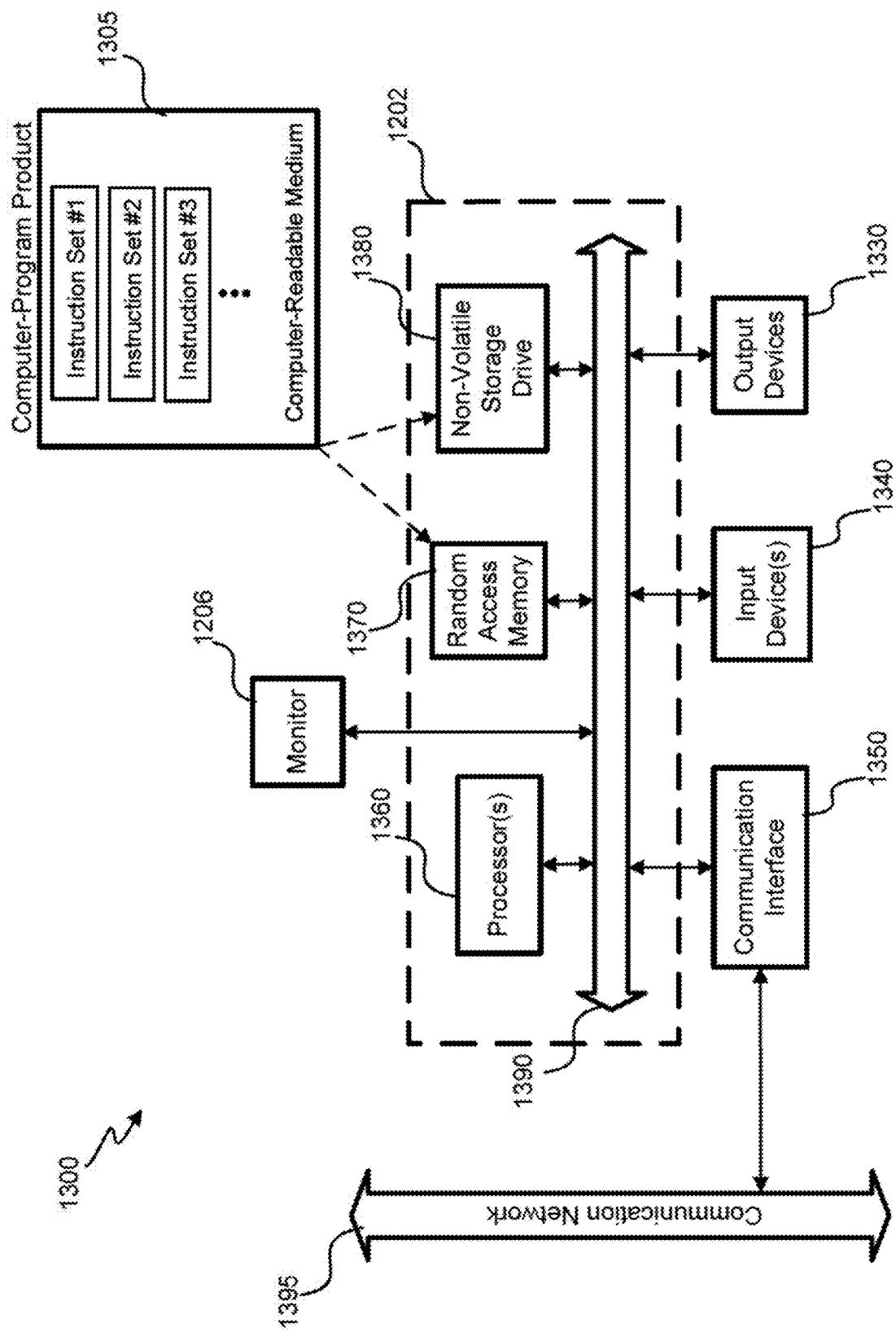
FIG. 13 depicts a block diagram of an embodiment of a special-purpose computer system.

With reference to FIG. 13, an embodiment of a special-purpose computer system 1300 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof.

After loading the computer-program products on a general purpose computer system, it is transformed into the special-purpose computer system 1300.

Special-purpose computer system 1300 comprises a computer 1202, a monitor 1206 coupled to computer 1202, one or more additional user output devices 1330 (optional) coupled to computer 1202, one or more user input devices 1340 (e.g., keyboard, mouse, track ball, touch screen) coupled to computer 1202, an optional communications interface 1350 coupled to computer 1202, a computer-program product 1305 stored in a tangible computer-readable memory in computer 1202. Computer-program product 1305 directs system 1300 to perform the above-described methods. Computer 1202 may include one or more processors 1360 that communicate with a number of peripheral devices via a bus subsystem 1390. These peripheral devices may include user output device(s) 1330, user input device(s) 1340, communications interface 1350, and a storage subsystem, such as random access memory (RAM) 1370 and non-volatile storage drive 1380 (e.g., disk drive, optical drive, solid state drive), which are forms of tangible computer-readable memory.

Computer-program product 1305 may be stored in non-volatile storage drive 1380 or another computer-readable medium accessible to computer 1202 and loaded into memory 1370. Each processor 1360 may comprise a microprocessor, such as a microprocessor from Intel® or Advanced Micro Devices, Inc.®, or the like. To support computer-program product 1305, the computer 1202 runs an operating system that handles the communications of product 1305 with the above-noted components, as well as the communications between the above-noted components in support of the computer-program product 1305. Exemplary operating systems include Windows® or the like from Microsoft Corporation, Solaris® from Sun Microsystems, LINUX, UNIX, and the like.

User input devices 1340 include all possible types of devices and mechanisms to input information to computer 1202. These may include a keyboard, a keypad, a mouse, a scanner, a digital drawing pad, a touch screen incorporated into the display, audio input devices such as voice recognition systems, microphones, and other types of input devices. In various embodiments, user input devices 1340 are typically embodied as a computer mouse, a trackball, a track pad, a joystick, wireless remote, a drawing tablet, a voice command system. User input devices 1340 typically allow a user to select objects, icons, text and the like that appear on the monitor 1206 via a command such as a click of a button or the like. User output devices 1330 include all possible types of devices and mechanisms to output information from computer 1202. These may include a display (e.g., monitor 1206), printers, non-visual displays such as audio output devices, etc.

Communications interface 1350 provides an interface to other communication networks and devices and may serve as an interface to receive data from and transmit data to other systems, WANs and/or the Internet 1218. Embodiments of communications interface 1350 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1350 may be coupled to a computer network, to a FireWire® bus, or the like. In other embodiments, communications interface 1350 may be physically integrated on the motherboard of computer 1202, and/or may be a software program, or the like.

RAM 1370 and non-volatile storage drive 1380 are examples of tangible computer-readable media configured to store data such as computer-program product embodiments, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1370 and non-volatile storage drive 1380 may be configured to store the basic programming and data constructs that provide the functionality of various embodiments.

Software instruction sets that provide functionality may be stored in RAM 1370 and non-volatile storage drive 1380. These instruction sets or code may be executed by the processor(s) 1360. RAM 1370 and non-volatile storage drive 1380 may also provide a repository to store data and data structures. RAM 1370 and non-volatile storage drive 1380 may include a number of memories including a main random access memory (RAM) to store of instructions and data during program execution and a read-only memory (ROM) in which fixed instructions are stored. RAM 1370 and non-volatile storage drive 1380 may include a file storage subsystem providing persistent (non-volatile) storage of program and/or data files. RAM 1370 and non-volatile storage drive 1380 may also include removable storage systems, such as removable flash memory.

Bus subsystem 1390 provides a mechanism to allow the various components and subsystems of computer 1202 communicate with each other as intended. Although bus subsystem 1390 is shown schematically as a single bus, alternative embodiments of the bus subsystem 1390 may utilize multiple busses or communication paths within the computer 1202.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that include or carry instruction(s) and/or data.

While the principles of the disclosure have been described above in connection with specific apparatuses and methods, it is to be clearly understood that this description is made only by way of example and not as limitation on the scope of the disclosure. For example, a total station could be used to give relative positions of some of the targets and bundle adjustment could still be used to refine target location and/or positions.

The specific details of particular embodiments may be combined in any suitable manner without departing from the spirit and scope of embodiments. However, other embodiments may be directed to specific embodiments relating to each individual aspect, or specific combinations of these individual aspects.

The above description of exemplary embodiments has been presented for the purposes of illustration and description. It is not intended to be exhaustive or to limit to the precise form described, and many modifications and variations are possible in light of the teaching above.

The embodiments were chosen and described in order to explain the principles of the invention and practical applications to thereby enable others skilled in the art to best utilize the invention in various embodiments and with various modifications as are suited to the particular use contemplated.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. A method for determining target positions using bundle adjustment, the method comprising:
    placing a camera system at a plurality of positions;
    acquiring images of a plurality of targets while the camera system is placed at the plurality of positions, wherein the plurality of positions includes a first position, a second position, and one or more other positions;
    determining a distance between the first position and the second position;
    estimating relative heading orientations between a first heading of the camera system while at the first position and a second heading of the camera system while at the second position based on images of the plurality of targets;
    estimating height position of targets based on estimates of relative heading orientations and images of the plurality of targets;
    calculating initial target locations using the distance between the first position and the second position, relative heading orientations of the camera system at the first position and at the second position, estimated height position of targets, and images of the plurality of targets acquired by the camera system while the camera system was at the first position and at the second position;
    calculating initial locations of the one or more other positions based on the initial target locations and images of the plurality of targets acquired by the camera system while the camera system was at the one or more other positions; and
    calculating actual locations of the plurality of positions and actual target locations by running bundle adjustment with initial positions of the one or more other positions and initial target locations as initial values for the bundle adjustment.

2. The method of claim 1, wherein placing the camera system at the first position and at the second position is performed by keeping changes to relative heading less than plus or minus 5 degrees in at least one of three degrees of rotational freedom.

3. The method of claim 1, further comprising determining an error range of heading orientations of the camera system at the second position in relation to an orientation of the camera system while at the first position; and calculating initial target locations based on optimizing camera system heading within the error range.

4. The method of claim 1, further comprising adding a set of one or more targets to the plurality of targets, wherein the set of one or more targets includes one or more targets that were not identified as targets by the camera system at both the first position and at the second position.

5. The method of claim 1, wherein the camera system comprises a plurality of image sensors, wherein:
the plurality of image sensors are oriented around a center of the camera system; and
orientations of the image sensors relative to each other are known.

6. The method of claim 5, wherein the camera system comprises a pole, and the method further comprises resting the camera system on the ground at the first position and at the second position using the pole.

7. The method of claim 1, wherein the targets are uniquely identifiable to the camera system.

8. The method of claim 1, wherein placing the camera system at the second position includes placing the camera system at the second position so that the camera system has similar roll and pitch compared to the camera system while placed at the first position.

9. The method of claim 1, wherein estimating relative heading orientations between the first heading of the camera system while at the first position and a second heading of the camera system while at the second position comprises:
calculating a first plurality of target rays and a second plurality of target rays, wherein:
the camera system comprises a plurality of image sensors;
the plurality of image sensors are arranged about a center of the camera system;
each target ray is generated by determining a ray modeled to start from the center of the camera system and toward a target imaged by an image sensor of the plurality of image sensors;
each target ray is projected as a line on a two-dimensional plane;
the first plurality of target rays correspond to target locations while the camera system is at the first position;
the first plurality of target rays extend from a first center of a first coordinate system;
the second plurality of target rays correspond to target locations while the camera system is at the second position;
the second plurality of target rays extend from a second center of a second coordinate system; and
the first center is modeled to be separated from the second center by the distance between the first position and the second position; and
rotating the second coordinate system about an axis orthogonal to the two-dimensional plane to maximize a number of intersecting target rays on the two-dimensional plane, wherein intersecting target rays correspond to a same target.

10. A system comprising:
a camera system comprising a plurality of image sensors oriented around a center of the camera system;
a plurality of targets for stationary placement in an area;
one or more memory devices containing instructions that when executed cause one or more processors to:
acquire images of the plurality of targets while the camera system is placed at a plurality of positions, wherein the plurality of positions includes a first position, a second position, and one or more other positions;
estimate relative heading orientations between a first heading of the camera system at the first position and a second heading of the camera system at the second position, based on images of the plurality of targets;
estimate height position of targets based on estimates of relative heading orientations and images of the plurality of targets;
calculate initial target locations using a distance between the first position and the second position, relative heading orientations of the camera system at the first position and at the second position, estimated height position of targets, and images of the plurality of targets acquired by the camera system while the camera system was at the first position and at the second position;
calculate initial locations of the one or more other positions based on the initial target locations and images of the plurality of targets acquired by the camera system while the camera system was at the one or more other positions; and
calculate actual locations of the plurality of positions and actual target locations by running bundle adjustment with initial locations of the one or more other positions and initial target locations as initial values for the bundle adjustment.

11. The system of claim 10, wherein the instructions when executed cause the one or more processors to:
determine an error range of heading orientations of the camera system at the second position in relation to an orientation of the camera system while at the first position; and
calculate initial target locations based on optimizing camera system heading within the error range.

12. The system of claim 10, wherein the instructions when executed cause the one or more processors to add a set of one or more targets to the plurality of targets, wherein the set of one or more targets includes one or more targets that were not identified as targets by the camera system at both the first position and at the second position.

13. The system of claim 10, wherein orientations of the image sensors relative to each other are known.

14. The system of claim 10, wherein the camera system comprises a pole configured to support the camera system while the camera system is at the first position and while at the second position.

15. The system of claim 10, wherein targets are uniquely identifiable to the camera system.

16. A method for determining relative heading orientations of a camera system at two positions, the method comprising:
placing the camera system at a first position and at a second position;
determining a distance between the first position and the second position;
acquiring images of a plurality of targets while the camera system is at the first position and the second position;
calculating a first plurality of target rays and a second plurality of target rays, wherein:
the camera system comprises a plurality of image sensors;
the plurality of image sensors are arranged about a center of the camera system;
each target ray is generated by determining a ray modeled to start from the center of the camera system and toward a target imaged by an image sensor of the plurality of image sensors;

each target ray is projected as a line on a two-dimensional plane;
the first plurality of target rays correspond to target locations while the camera system is at the first position;
the first plurality of target rays extend from a first center of a first coordinate system;
the second plurality of target rays correspond to target locations while the camera system is at the second position;
the second plurality of target rays extend from a second center of a second coordinate system; and
the first center is modeled to be separated from the second center by the distance between the first position and the second position; and
rotating the second coordinate system about an axis orthogonal to the two-dimensional plane to maximize a number of intersecting target rays on the two-dimensional plane, wherein intersecting target rays correspond to a same target.

17. The method of claim 16, further comprising determining a range of headings that maximize the number of intersecting target rays.

18. The method of claim 16, further comprising estimating heights of targets by averaging rays from the first plurality of target rays and the second plurality of target rays for each target, wherein height is measured in a direction normal to the two-dimensional plane.

19. The method of claim 16, comprising:
placing the camera system at one or more other positions, in addition to the first position and the second position;
acquire images of the plurality of targets while the camera system is at the one or more other positions;
estimating height position of targets based on estimates of relative heading orientations and images of the plurality of targets;
calculating initial target locations using the distance between the first position and the second position, relative heading orientations of the camera system at the first position and at the second position, and images of the plurality of targets acquired by the camera system while the camera system was at the first position and at the second position;
calculating initial locations of the one or more other positions based on the initial target locations and images of the plurality of targets acquired by the camera system while the camera system was at the one or more other positions; and
calculating actual locations of the first position and the second position and actual target locations by running bundle adjustment with initial positions of the one or more other positions and initial target locations as initial values for the bundle adjustment.

20. The method of claim 16, wherein targets of the plurality of targets are uniquely identifiable to the camera system.

* * * * *